Figure 3:
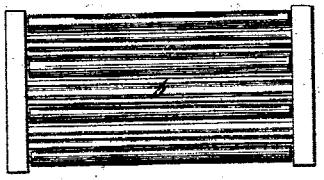
Figure 2:
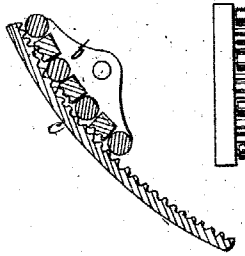
Figure 1:
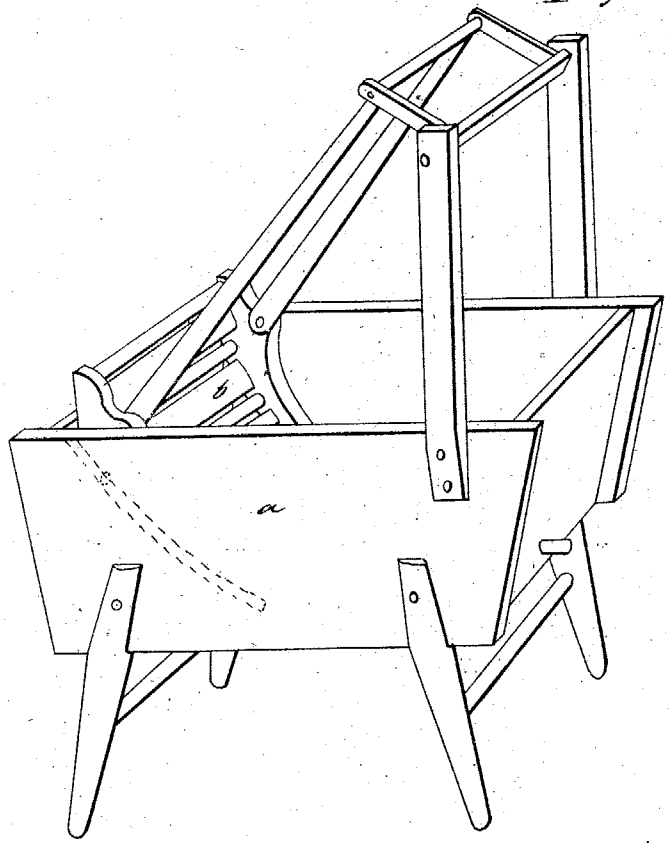

7084X

E. Fisk,

Washing Machine,

Patented May 25, 1832.

18 70844

Ezra Fisk.
Letters Patent Dated May 25 1832.

---

The schedule referred to in these Letters Patent, and making part of the same, containing a description in the words of the said Ezra Fisk himself, of his improvement in the Washing Machine

---

To all to whom these presents shall come:
Be it known that I, Ezra Fisk of Fayette in the County of Kennebec, and State of Maine, have invented a new and useful improvement in the washing machine, and that the following is a full and exact description of the construction and operation of the said machine, as invented or improved by me.

This machine is constructed to work in an oblong square box or tub, which admits of various sizes: But for ordinary use in private families, the tub may be about thirty inches in length eighteen inches in width and twelve inches in depth; and in this tub is placed a curved apron which consists of two side pieces of some suitable kind of hard wood board, nineteen inches in length, two inches in width, and one inch in thickness.

These pieces are placed in the sides of the tub with the concave edges upwards one end of each resting on the bottom of the tub - the other ends elevated about nine inches, and reclining against the front end of the tub, in which position they are covered with a board of some suitable kind of hard wood which extends across the whole width of the tub, and across the whole length of the side pieces excepting about three inches at the elevated ends. The upper surface of the board is
fluted or reeded like a common wash board.

To prevent the apron from sliding on the bottom of the
tub, small cleats are attached to the sides of the tub at the
bottom. The reeded board of the apron is confined to
the side pieces by suitable nails or screws. A rubber is
constructed to operate on the apron, consisting of
two side pieces about nine inches in length three
inches in width & three fourths of an inch in thickness.
These pieces are placed on the apron about fourteen
inches asunder, the lower edges being convex so as to
correspond to the curve of the apron, and the upper
edges curved or beveled, so as to reduce the width to two
inches at the ends. The side pieces of the rubber thus
described, are connected by several pieces of board, say
three or four in number, one inch in width and three
fourths of an inch in thickness, with suitable tenons on the
ends that are inserted in corresponding mortices made
in the side pieces so as to leave a space of one inch
between them, the underside of the pieces being reeded.

The reeded surfaces of these pieces form a level with
the convex edges of the side pieces, and the vacant
spaces between them are occupied by rollers that
are seven eighths of an inch diameter, with small
gudgeons of iron or other hard metallic substance inser-
ted in the ends, and the gudgeons work in round
perforations, one fourth of an inch diameter,
made in the side pieces so that the rollers project
one fourth of an inch below the reeded surface
of the intervening pieces; one roller is also placed at
each end of the side pieces. Circular perforations
three fourths of an inch diameter are made thro' the

70844 side pieces of the rubber, at the centre (as respects the
length) about one inch below the upper edges.

The rubber thus constructed, is suspended by a
kind of frame work that is supported by two posts
which may be two inches in width and one inch
in thickness. These posts are attached to the outsides
of the tub, about seven inches from the rear end,
extending in a vertical position, twenty two inches
above the tub; and the posts are confined in
their position by sinking the lower ends in somewhat
[illegible] into the sides of the tub, or they may be
confined by any other suitable kind of fasten-
ing.

The upper ends of the posts are connected by a cross
piece of wood which may be either square or round
about one inch and a half through, with gudgeons
made on the ends, fitted to work in round perfo-
rations, three fourths of an inch diameter, made
thro the posts, one inch below the upper ends. Two
perforations which may be either round or square,
are made thro the above described cross piece,
about two inches from the posts and in these
perforations are inserted the ends of two pieces
of wood that extend in the rear about seven inches,
the outward ends being about inch and a half deep
and three fourths of an inch thick, and thro these,
about an inch from the rear ends, are made hor-
izontally, round perforations, three fourths
of an inch diameter and these ends are connec-
ted by a cross piece that may be either square or
round, about an inch and one fourth through,
with gudgeons on the end fitted to work in the [illegible]

mentioned perforations. Two round perforations three fourths of an inch diameter, or square mortises equivalent, are made thro' the last describe cross piece, one inch and a half from the shoulders of the gudgeons, and in these perforations, or mortises are inserted suitable tenons made on the ends of two pieces which extend from the last described cross piece down to the rubber as it is at rest on the apron. These pieces are about twenty six inches in length, three fourths of an inch in thickness, and two inches in width at the lower end; But the width diminishes to an inch and one fourth at the upper ends, the width of the pieces corresponding to the length of the tub.

Round perforations one inch diameter, are made thro the pieces last described, about an inch from the lower ends, and the ends being placed within the side pieces of the rubber are connected therewith by a roller that is an inch and one fourth through with gudgeons on the ends fitted to work in the perforations last mentioned. The gudgeons pass also thro' the side pieces in the perforations made at the centre as before described.

The gudgeons must work easily in the pieces by which the rubber is suspended, but they are confine in the pieces of the rubber by being pinned thro.

The machine, thus constructed, may be worked on any suitable frame fitted to sustain it, or it may be worked on a common wash bench or any other convenient conveniance.

To operate the machine, the clothes must be prepare for washing as in the usual way, and the tub supplied

7084X with a sufficient quantity of warm water and soap.
One large piece or several smaller pieces may
be placed on the apron, duly spread on the [illegible]
surface, and the rubber applied with a rugged or
gentle motion as occasion may require.

The dirty suds are drawn off by means of a
faucet, or plug, inserted in the rear end of the
tub near the bottom.

Although specific dimensions are stated in
the foregoing specification of the machine, yet
the size and proportion of the several parts may
be varied to larger or smaller at pleasure, but so
as not to vary the general principles of the machine.

The specific, new, and useful improvements
comprised in the machine hereinbefore described,
and claimed by me, as being the first inventor
thereof, are the following:

1st The Rubber, as combining and presenting a sur-
face of rollers intermixed with fluted or reeded
pieces, and in its application and use, producing
a gentle operation on the clothes, which is in a
medium between a squeeze and rub, thereby
producing the effect of cleansing, expeditiously
and perfectly without wearing the clothes by too heavy
friction.

2d The particular mode of suspending the
rubber, being without the aid or assistance of
weights or springs.

3d The general manner of combining the parts
as being new, possessing in a high degree the advanta-
ges of regularity and ease, not liable to get out of
order, and in [illegible] operation [illegible] may

7084X nearly the common mode of writing, consequently requiring but little practice to become acquainted with the mode of using the machine advanta-geously.

In testimony that the above is a true specifi-cation of my said improvement as above stated, I have hereunto set my hand & seal the twenty first day of February in the year of our Lord, eighteen hundred and thirty two Witnesses — Ezra Fisk.

Saml. Blake

Francis N. Fisk ( Received and Recorded a new August 2 [illegible])

Ezo

[illegible] made by Al. 1841. — J.F.K 1770 words )